United States Patent [19]

Voorhis et al.

[11] Patent Number: 4,873,838
[45] Date of Patent: Oct. 17, 1989

[54] REFRIGERANT METERING IN A VARIABLE FLOW SYSTEM

[75] Inventors: Roger J. Voorhis, Liverpool; John M. Palmer, Syracuse, both of N.Y.

[73] Assignee: Carrier Corporation, Syracuse, N.Y.

[21] Appl. No.: 137,009

[22] Filed: Mar. 28, 1988

Related U.S. Application Data

[63] Continuation of Ser. No. 925,758, Oct. 31, 1986, abandoned.

[51] Int. Cl.$^4$ .............................................. F25B 41/00
[52] U.S. Cl. .................................. 62/207; 62/228.4; 62/117; 251/129.05
[58] Field of Search .................... 62/228.4, 226, 204, 62/229, 227, 207; 251/129.05

[56] References Cited

U.S. PATENT DOCUMENTS

| | | | |
|---|---|---|---|
| 1,746,184 | 2/1930 | Bernat | 62/210 |
| 2,943,643 | 7/1960 | Pinter et al. | 251/117 X |
| 3,446,473 | 5/1969 | Barker | 251/129.05 X |
| 4,112,703 | 9/1978 | Kountz | 62/211 |
| 4,425,767 | 1/1984 | Barbier | 236/75 X |
| 4,495,779 | 1/1985 | Tanaka et al. | 62/223 X |
| 4,506,518 | 3/1985 | Yoshikawa et al. | 62/227 |
| 4,552,304 | 11/1985 | Papazian | 236/46 F |
| 4,576,012 | 3/1986 | Luzenberg | 236/46 F |
| 4,632,358 | 12/1986 | Orth et al. | 251/117 |
| 4,651,535 | 3/1987 | Alzenz | 62/223 X |

Primary Examiner—William E. Wayner
Attorney, Agent, or Firm—Dana F. Bigelow

[57] ABSTRACT

In a refrigeration system having a compressor driven by a variable speed motor, the refrigerant flow volume through the expansion device is controlled by way of a solenoid driven piston which alternately opens and closes the orifice, with the duty cycle of the solenoid being controlled such that the time period in which the orifice is open is proportional to the speed of the motor. A bypass channel is provided in parallel around the orifice such that a minimal flow is provided to thereby share the load with the modulating orifice and act to dampen the movement of the solenoid piston.

11 Claims, 2 Drawing Sheets

REFRIGERANT METERING IN A VARIABLE FLOW SYSTEM

This application is a continuation of application Ser. No. 925,758 filed Oct. 31, 1986, now abandoned.

BACKGROUND OF THE INVENTION

This invention relates generally to air conditioning systems and, more particularly, to a method and apparatus for varying the effective orifice of an expansion device in a variable mass flow refrigeration system.

In a typical refrigeration cycle, the refrigerant flow to the evaporator coil is metered by way of an expansion device which restricts the flow of refrigerant in a controlled manner to thereby control the amount of superheat in the system. Capillary tubes and thermal expansion valves (TXV's) are the most common types of expansion devices used in refrigeration systems. Capillary tubes are of fixed dimensions selected to provide the desired operational characteristics for a particular system, whereas a TXV is a variable flow device which is automatically modulated in response to superheat conditions to thereby vary the refrigerant flow in such a way as to obtain the desired superheat conditions.

Another type of expansion device used in refrigeration systems is a so-called "accurater", shown and described in U.S. Pat. No. 3,992,898, assigned to the assignee of the present invention. This patent is hereby incorporated herein by reference. An attractive feature of this device is the ability to select and change pistons so that the orifice size can be chosen to match the desired flow characteristics of a particular system. Once installed, the piston, like a capillary tube, has a fixed dimension. But unlike a capillary tube, the accurater can be easily and economically adapted for use with any of a number of system load conditions by changing the piston size.

Heretofore, refrigeration systems have primarily been operated at a single constant speed. That is, the compressor was either turned off, in which case the system was not in operation, or turned on to run at a constant speed. The expansion devices as mentioned hereinabove, were therefore chosen to be compatible with the flow characteristics of that operational speed. In some cases, a two-speed compressor was used to provide two discreet levels of refrigerant flow conditions. These two flow volumes have traditionally been accommodated by a TXV which automatically provided a smaller expansion orifice when operating at the lower speed.

In an effort to optimize the operating efficiency of a refrigeration system, the applicants have applied a variable speed motor to drive a compressor. One of the characteristics of such a variable speed system is that of operating within a continuous and infinite range of speeds rather than at one or two discreet levels. Although a TXV may be responsive to vary its orifice over a range of speeds, it was not designed to operate in this manner. Accordingly, its accuracy and responsiveness have been found to be unsuitable for use in such a variable speed system. Further, the operating range of a typical TXV is not sufficient for use in such a system where the compressor is driven by a variable speed motor.

It is therefore an object of the present invention to provide an improved expansion device for a variable speed air conditioning system.

Another object of the present invention is the provision in an air conditioning system for metering the flow of refrigerant over a continuous range of compressor speeds.

Yet another object of the present invention is the provision in a variable speed air conditioning system for accurately and responsively varying the refrigerant flow with the speed.

Still another object of the present invention is the provision in a variable speed air conditioning system for an expansion device which is economical to manufacture and extremely functional in use.

These objects and other features and advantages become more readily apparent upon reference to the following description when taken in conjunction with the appended drawings.

SUMMARY OF THE INVENTION

Briefly, in accordance with one aspect of the invention, an expansion device with a relatively large fixed diameter orifice is placed in the system. A movable piston is made to alternately close off and open the orifice as the piston moves. The effective orifice size is therefore varied by selective modulation of the piston movements, with the refrigerant flow rate through the orifice being determined by the ratio between the time in which the piston remains in the open position as compared with the time the piston remains in the closed position.

By another aspect of the invention, the valve piston is reciprocated by way of a solenoid which is cycled in response to the compressor motor speed command signal. In this way, as the compressor motor speed is increased by an increase in the speed command signal, the duty cycle of the piston is changed so as to thereby provide a larger effective orifice and a larger flow rate therethrough. Slower compressor speeds, brought on by lower speed command signals in turn, will automatically reduce the flow rate through the expansion device.

By yet another aspect of the invention, the expansion device is provided with a bypass channel, in parallel with the flow orifice, to provide a minimum flow of refrigerant irrespective of the particular duty cycle of the valve piston at any time. In this way, it is not necessary for the piston to meter the entire refrigerant flow volume, but only that flow volume which exceeds the minimal flow volume passing through the bypass. As a result, there is no positive shutoff of the entire refrigerant flow, which would otherwise initiate pulses in the line to thereby cause vibrations. Further, since the amount of refrigerant flow through the metered orifice, and therefore the pressure drop thereacross, is substantially reduced, the life of the modulating valve is substantially increased.

By still another aspect of the invention, the modulating valve of the present invention may take the form of a uni-directional device as where only cooling is required, or, alternatively, it may be a bi-directional device, as used in a heat-pump, wherein modulated metering is provided in one direction of refrigerant flow and the relatively unrestricted bypass flow is provided in the other direction of refrigerant flow.

In the drawings as hereinafter described, preferred and modified embodiments are depicted. However, various other modifications and alternate constructions can be made thereto without departing from the true spirit and scope of the invention.

DESCRIPTION OF THE PREFERRED EMBODIMENT

Figure 1:
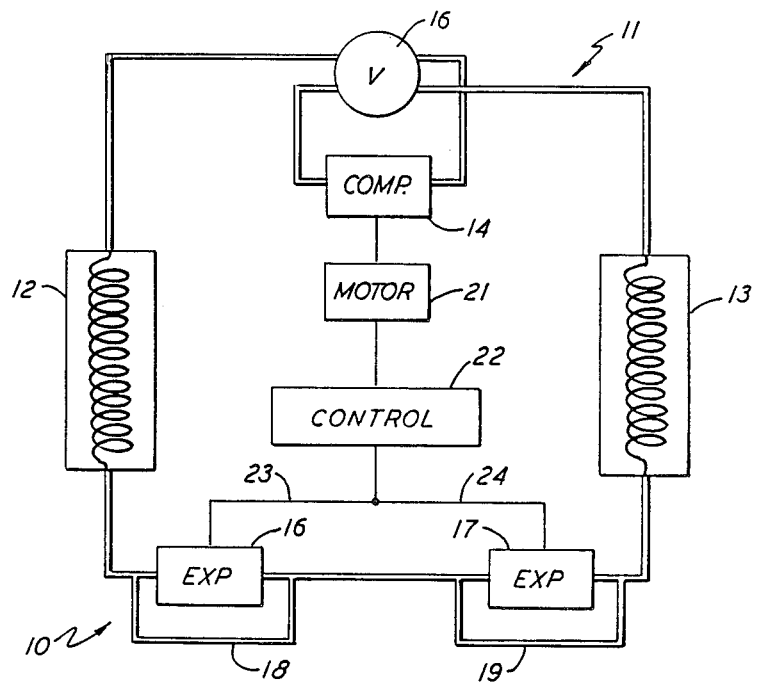
FIG. 1 shows a typical heat pump system into which the present invention has been incorporated.

Referring now to FIG. 1, the invention is shown generally at 10 as applied to a heat pump system 11 comprising an outdoor coil 12, an indoor coil 13, and a compressor 14. A reversing valve 16 is provided to selectively reverse the roles of the outdoor and indoor coils 12 and 13, respectively, when changing between heating and cooling functions of the system. Further in keeping with the dual capability of the system, there is an expansion device associated with the entrance to each of the coils 12 and 13 as shown at 16 and 17, respectively. The expansion devices 16 and 17 have bypass channels, shown schematically at 18 and 19, which allows one expansion device to be effectively bypassed when the other one is metering refrigerant to its associated evaporator coil.

Driving the compressor 14 is a motor 21 of the variable speed type. An example of such a variable speed compressor assembly which has been found suitable for this purpose is the Model CVA-0150 Variable Speed Compressor, commercially available from Copeland Corporation and controlled by an Invertor Assembly available from Carrier Corporation as Part No. 38QV400094. Another way of obtaining the variable speed capability is that of using an electrically commutated motor (ECM) of a type commercially available from General Electric Company. In any case, the speed of the motor 21 is varied by speed command signals from a control 22 in response to sensed ambient and system conditions. In general, the motor speed is increased for operation under high load conditions and decreased for operation under low load conditions.

In accordance with the present invention, the expansion devices 16 and 17 are adaptable for use under variable speed conditions, with the effective orifice sizes thereof being substantially proportional to the desired flow rate of the refrigerant, which in turn is proportional to the speed the compressor motor 21. Electrical signals are sent from the control 22 along lines 23 and 24 to control the expansion devices 16 and 17 for that purpose. The particular manner in which those devices are controlled is described hereinbelow.

It should be understood that the present invention is intended for use in any refrigerant system having an expansion device for metering of refrigerant flow to the evaporator coil. For example, a single such unit can be used in a condensing unit intended for cooling only, or a pair of such units may be used in a heat pump system as shown in FIG. 1.

Figure 2:
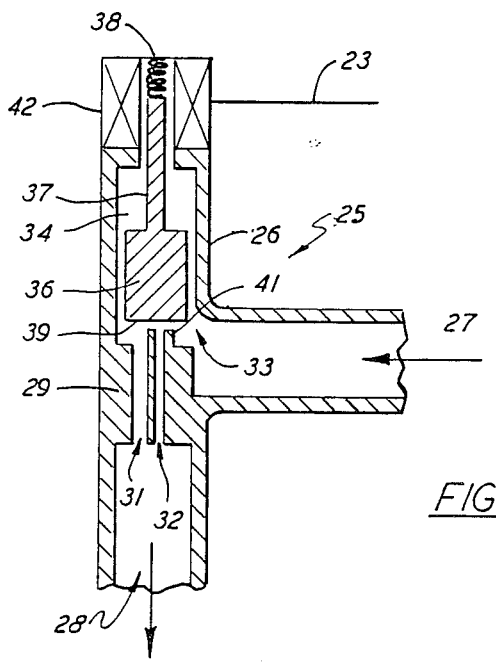
FIG. 2 shows one embodiment of the expansion device portion of the present invention.

In FIG. 2 there is shown such a uni-directional expansion device or solenoid valve 25 useful in systems that are used only for cooling. The valve body 26 has an inlet opening 27 into which the refrigerant flows from the condenser coil, and a discharge opening 28 from which the refrigerant is discharged at a reduced pressure to then flow to the evaporator coil. A land portion 29 defines a bypass orifice 31 and a modulated orifice 32 which provide parallel flow paths for fluidly interconnecting the inlet opening 27 to the discharge opening 28. Thus, unless otherwise restricted as will be described hereinafter, the refrigerant is free to flow into the inlet opening 27, into the side channel 33, and through both of the bypass orifice 31 and the modulated orifice 32, and out the discharge opening 28. The bypass orifice 31 and the modulated orifice 32 are sized so as to cooperate in the metering of refrigerant flow, with the bypass orifice 31 being fixed in size and with the modulated orifice 32 having a fixed diameter but having its effective size being modulated in accordance with accordance with the present invention.

The valve body 26 defines a chamber 34 within which a piston 36 is reciprocally disposed. The piston 36 has a stem 37 which extends upwardly to be engaged at its end by a compression spring 38. The compression spring 38 tends to bias the piston 36 downwardly such that its one end 39 engages the one end 41 of the modulated orifice 32 to thereby close it off to the flow of refrigerant. The solenoid coil 42, which is energized by electrical signals along line 23, surrounds the upper end of the stem 37 as shown so as to operate, when activated, to lift the piston 26 upwardly, against the bias of the spring 38, to thereby open the modulated orifice 32 to the free flow of refrigerant therethrough. In accordance with the present invention, the electrical impulses to the coil 42 along line 23 are modulated to thereby cause the piston 36 to reciprocate in a controlled manner such that the duty cycle of open time as compared with closed time determines the effective size of the orifice and therefore the flow rate through the modulated orifice 32. To accommodate the changes in flow rates with changes in motor speed, the duty cycle is modified in response to motor speed command signal changes.

It will be understood that, no matter what the duty cycle of the piston 36 is at any one time or whether or not it is even operating, the bypass orifice 31 will provide for a minimum flow of refrigerant whenever the compressor is in operation. This feature has been found to be very beneficial to the desired operational characteristics of the solenoid operated expansion device. That is, since the solenoid valve controls only a portion of the refrigerant flow, its life has been found to be substantially prolonged. The primary reason is that the bypass flow tends to dampen the movement of the piston 36 as it moves within its two extreme positions at the fully opened and fully closed positions. Further, the refrigerant flow in the bypass orifice 31 prevents a positive shutoff condition which would otherwise tend to send pulses through the line to set up undesirable vibrations.

In operation, until the compressor speed reaches a certain predetermined level, the piston 36 remains in its closed position to allow the entire refrigerant flow to pass through the bypass orifice 31. When that predetermined compressor speed is reached, and at all compressor speeds above that level, the piston is made to reciprocate at a relatively low frequency (e.g. 0.2 hertz). As the compressor motor speeds are increased, the duty cycle of the piston is changed accordingly so as to increase, in substantial direct proportion, the time period in which the piston is in the open position. However, the complete cycle remains at the established low frequency at all times. In this way, the flow rate of refrigerant through the expansion device is very accurately and responsively controlled. At the same time, the performance demands on the solenoid valve is minimized to thereby provide a valve with a relatively long life.

Figure 3:
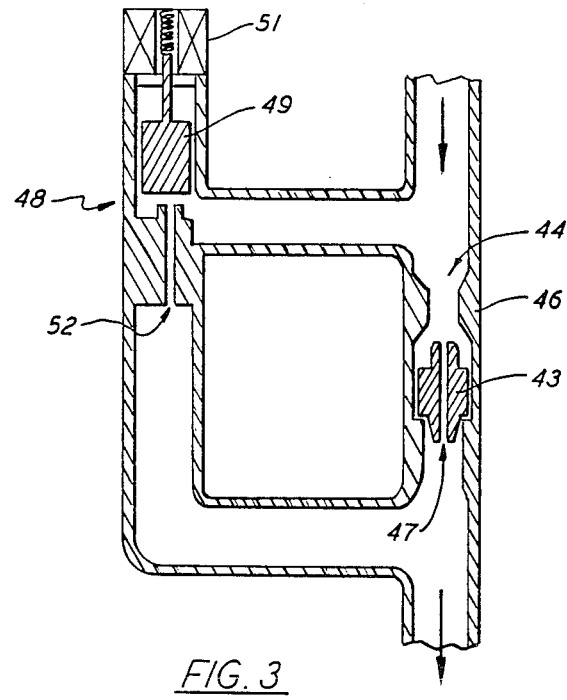
FIG. 3 shows an alternative embodiment thereof.

Referring now to FIG. 3, there is shown, in accordance with the present invention, a form of the expansion device that is suitable for bi-directional use. In this embodiment, a piston 43 of the accurater type is mounted in the flow channel 44 of the body 46 so as to provide the bypass function described hereinabove by way of the central bore 47 in the piston 43 as shown. The piston 43 then moves within the body 46 when the refrigerant flows in the opposite direction to thereby bypass the bore in the manner which is customary for such a so-called "bypass accurater". In other words, the accurater piston 43 is used in such a manner that when it is in position as shown, it is metering the flow to provide a minimal bypass flow around the solenoid valve device 48, and when the flow direction is reversed, it provides effectively no substantial restriction of the flow through the flow channel 44. The solenoid valve 48 has a piston 49 which is modulated by a solenoid coil 51 to vary the effective size of the modulated orifice 52 in the same way as described for the solenoid valve 25 hereinabove. Thus, when the compressor is operating at relatively low speeds with the refrigerant flowing in the direction as shown, all of the refrigerant flow passes through the flow channel 44. However, when the speed of the compressor reaches a predetermined level, the piston 49 begins to oscillate to thereby open the modulated orifice 52. The total flow is then made up of both that refrigerant flowing in flow channel 44 and that flowing through the modulated orifice 52. Again, the flow of refrigerant through the bore 47 provides a damping effect to the movement of the piston 49 during these periods of operation.

Figure 4:
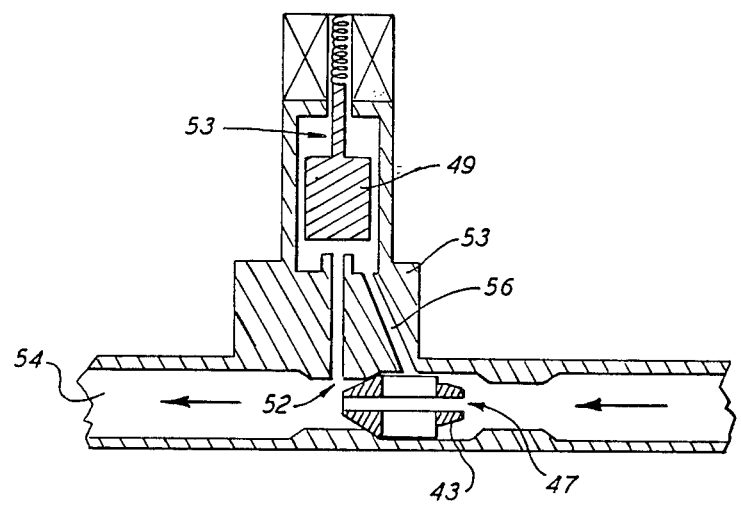
FIG. 4 shows another alternative embodiment thereof.

In FIG. 4 there is shown an alternative embodiment of the present invention as applied to a system having bi-directional flow requirements. Its function is much the same as the device shown in FIG. 3; however, it provides for a mounting of the accurater piston 43 in the same body 53 as the solenoid piston 49. The body 53 not only includes the modulated orifice 52 which communicates between the chamber 53 and the discharge flow duct 54, but also includes a feed channel 56 which provides fluid communication from the area surrounding the accurater piston 43 to chamber 53.

In operation under higher speed conditions of the compressor, the piston 49 is oscillated between the open and closed positions to thereby present an open condition to the modulated orifice 52. At this time, the accurater piston 43 is in the extreme left position as shown to allow for the flow of refrigerant through the bore 47 to provide a minimal bypass flow. At the same time, the piston 47 allows refrigerant to flow around its sides and through the feed channel 56, into the chamber 53 and through the modulated orifice 52 to provide a further metered flow of refrigerant. The combined flow through the bore 47 and through the modulated orifice 52 passes along the discharge flow duct 54 to the evaporator coil at a rate which is controlled to be compatible with the compressor motor speed at the time. When the refrigerant flow is in the opposite direction, the piston 49 is in the closed position and the piston 43 is in the extreme rightward position to allow the refrigerant to flow around its periphery in a substantially unrestricted manner.

It will be understood that the present invention has been described in terms of a preferred embodiment and modified embodiments, but may take on any number of other forms while remaining within the scope and intent of the invention.

What is claimed is:

1. In a refrigeration system of the type having a compressor driven by a variable speed motor and a heat exchanger coil for transferring heat to a contained refrigerant, an improved expansion device and control comprising:
    a motor control means responsive to sensed conditions for controlling the speed of the variable speed motor by way of a command speed signal;
    an orifice for conducting refrigerant to the evaporator coils said orifice acting as a throttle to expand the refrigerant from a liquid to a gaseous state;
    a piston associated with said orifice and selectively movable between a closed position to block the flow of refrigerant through said orifice and an opened position to expose said orifice to the free flow of refrigerant therethrough; and
    valve control means responsive to said command speed signal for selectively causing the piston to alternate between the open and closed positions with the ratios of open to closed time being controlled to selectively regulate the resultant flow volume to a rate which is substantially proportional to said command speed when the compressor is being driven above a predetermined speed.

2. An expansion device as set forth in claim 1 and including a bypass means for bypassing a portion of the refrigerant flow around said orifice for damping the movement of said piston between its open and closed positions.

3. An expansion device as set forth in claim 1 wherein said piston is disposed at one end of said orifice and includes biasing means for biasing said piston against said orifice.

4. An expansion device as set forth in claim 1 wherein said valve control means comprises a solenoid.

5. An improved refrigerant expansion and control apparatus of the type used for metering the flow of refrigerant in a refrigeration system having a compressor driven by a variable speed motor in response to a speed command signal, comprising:
    a body defining an orifice for conducting the flow of refrigerant therethrough;
    blockage means for selectively blocking said orifice to prevent the flow of refrigerant therethrough; and
    modulating means for alternately applying and removing said blocking means in a controlled sequence to thereby selectively regulate the resultant refrigerant flow volume to a rate which is substantially proportional to said speed command signal when the compressor is being driven above a predetermined speed.

6. A refrigerant expansion device as set forth in claim 5 wherein said body further includes a bypass channel in parallel with said orifice for metering a minimal flow of refrigerant and for damping the movement of said blocking means during modulation.

7. A refrigerant expansion device as set forth in claim 5 wherein said blockage means comprises a piston disposed at one end of said body and movable between a biased position against said body to block said orifice, and an open position away from said body.

8. A refrigerant expansion device as set forth in claim 5 wherein said modulating means comprises a solenoid with its piston connected to said blocking means.

9. In a refrigeration system having a compressor driven by a variable speed motor in response to a speed command signal, a method of controlling the volume of refrigerant flow through a refrigerant expansion device comprising the steps of:

provinging an orifice for the flow of refrigerant therethrough;

providing a blockage means for selectively blocking said orifice to prevent the flow of refrigerant therethrough; and alternately applying and removing said blocking means, with the respective times being controlled to a desired ratio so as to thereby selectively regulate the resultant flow volume to a rate which is substantially proportional to said speed command signal when the compressor is being driven above a predetermined speed.

10. A method as set forth in claim 1 wherein said step of alternately applying and removing said blocking means is accomplished with a solenoid.

11. A method as set forth in claim 9 and including an additional step of providing a bypass channel around said orifice to thereby bypass a portion of the refrigerant flow therearound to damp the movement of said blocking means.

* * * * *

UNITED STATES PATENT AND TRADEMARK OFFICE
CERTIFICATE OF CORRECTION

PATENT NO. : 4,873,838

DATED : 10/17/89

INVENTOR(S) : ROGER J. VOORHIS, JOHN M. PALMER, DERRICK A. MARRIS

It is certified that error appears in the above-identified patent and that said Letters Patent is hereby corrected as shown below:

ON THE TITLE PAGE, ITEM [75]
The listed inventors should be corrected to read as follows:

Inventors: ROGER J. VOORHIS, LIVERPOOL, NY
JOHN M. PALMER, SYRACUSE, NY
DERRICK A. MARRIS, BLOSSVALE, NY Signed and Sealed this Eleventh Day of June, 1991

Attest:

HARRY F. MANBECK, JR.

*Attesting Officer*       *Commissioner of Patents and Trademarks*